Oct. 19, 1937. S. L. LAUGHLIN ET AL Re. 20,536

OIL BURNER UNIT

Original Filed Jan. 25, 1927 4 Sheets-Sheet 1

Oct. 19, 1937. S. L. LAUGHLIN ET AL Re. 20,536

OIL BURNER UNIT

Original Filed Jan. 25, 192 4 Sheets-Sheet 2

Inventors

Samuel L. Laughlin
By Herman F. Braun
William J. Smith
Hull Brock & West

Attorney

Oct. 19, 1937. S. L. LAUGHLIN ET AL Re. 20,536

OIL BURNER UNIT

Original Filed Jan. 25, 1927 4 Sheets-Sheet 3

Inventors

Samuel L. Laughlin
By Herman F. Braun
William J. Smith
Hull Brock & West

Attorney

Oct. 19, 1937. S. L. LAUGHLIN ET AL Re. 20,536

OIL BURNER UNIT

Original Filed Jan. 25, 1927 4 Sheets-Sheet 4

Inventors

Samuel L. Laughlin

By Herman F. Braun
William J. Smith
Hull Brock & West

Attorney

Reissued Oct. 19, 1937

Re. 20,536

UNITED STATES PATENT OFFICE 20,536

OIL BURNER UNIT

Samuel L. Laughlin, Herman F. Braun, and William J. Smith, Cleveland, Ohio, assignors to Cleveland Steel Products Corporation, Cleveland, Ohio, a corporation of Ohio Original No. 1,655,016, dated January 3, 1928, Serial No. 163,352, January 25, 1927. Application for reissue February 20, 1929, Serial No. 341,549

26 Claims. (Cl. 158—77)

This invention relates to oil burners and is directed more particularly to oil burning units which are designed for use in connection with household furnaces.

The main object of the invention is to provide a burner unit of the character described which may be easily and quickly installed in the average household furnace and which shall be capable of effectively replacing the use of coal, gas or other fuels commonly used for heating purposes.

Another object of the invention is to provide a burner unit wherein the fuel oil is atomized by a rotary atomizing nozzle and which will effect an efficient mixture of air and atomized oil.

Another object of the invention is to provide a burner unit system of the character described which shall be entirely automatic in its operation and which is well adapted for use in connection with standard makes of thermostatic controls which are now on the market.

Another object of the invention is to provide a burner unit of the character described which is provided with means for cutting off the supply of fuel and discontinuing the operation of the motor should the fire fail to ignite or go out.

A still further object of the invention is to provide a novel and simple form of burner unit which comprises comparatively few parts and which is easily assembled and disassembled and which is readily accessible to permit cleaning or replacement of any desired part thereof and which by reason of its simplicity is inexpensive to manufacture and well adapted for quantity production at comparatively low cost.

With these objects in view and further objects which will appear as the description proceeds, the invention consists in the various features of construction and arrangement and combination of parts as will be more fully described hereinafter and pointed out in the appended claims.

Figure 1:
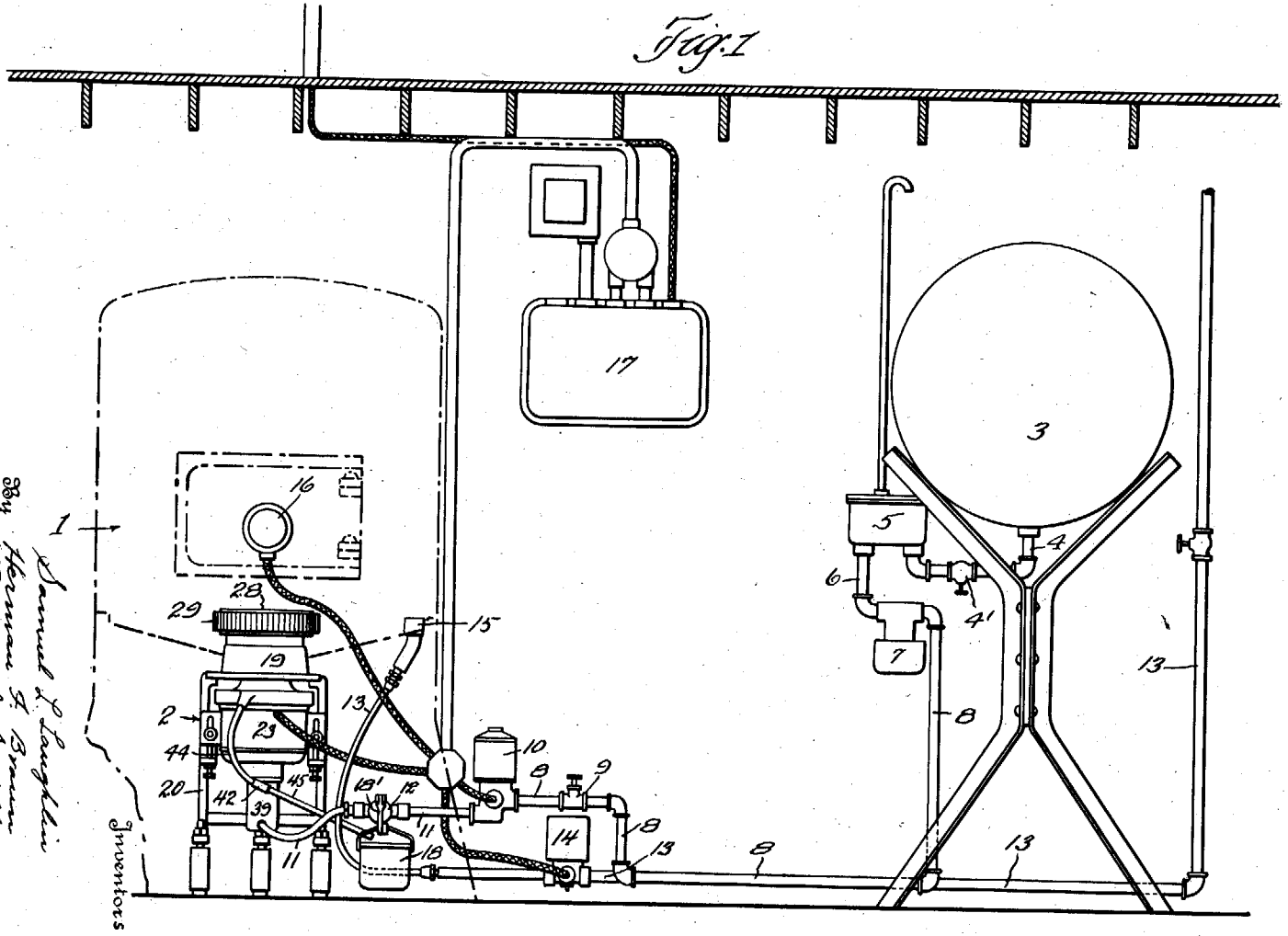
Figure 2:
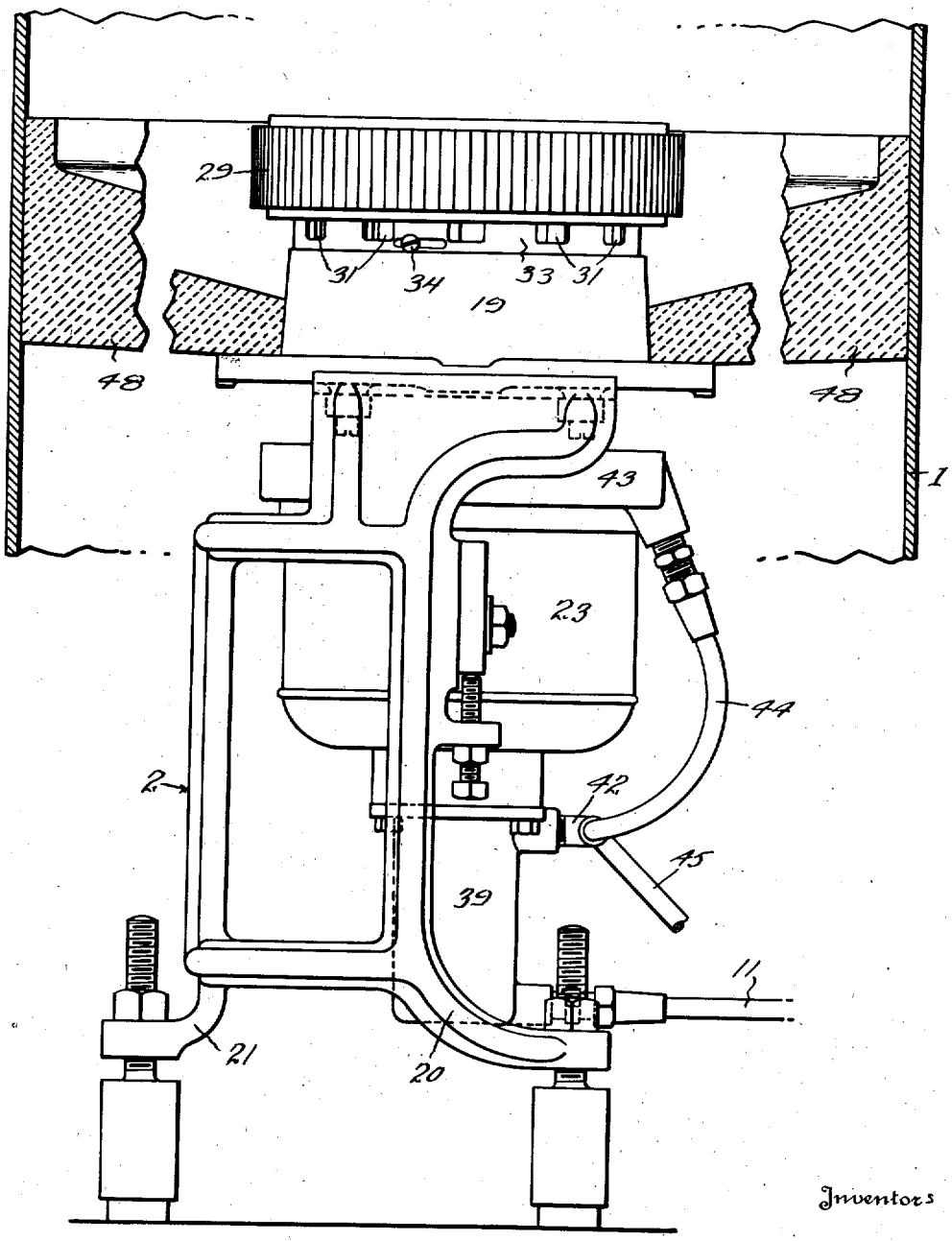
Figure 3:
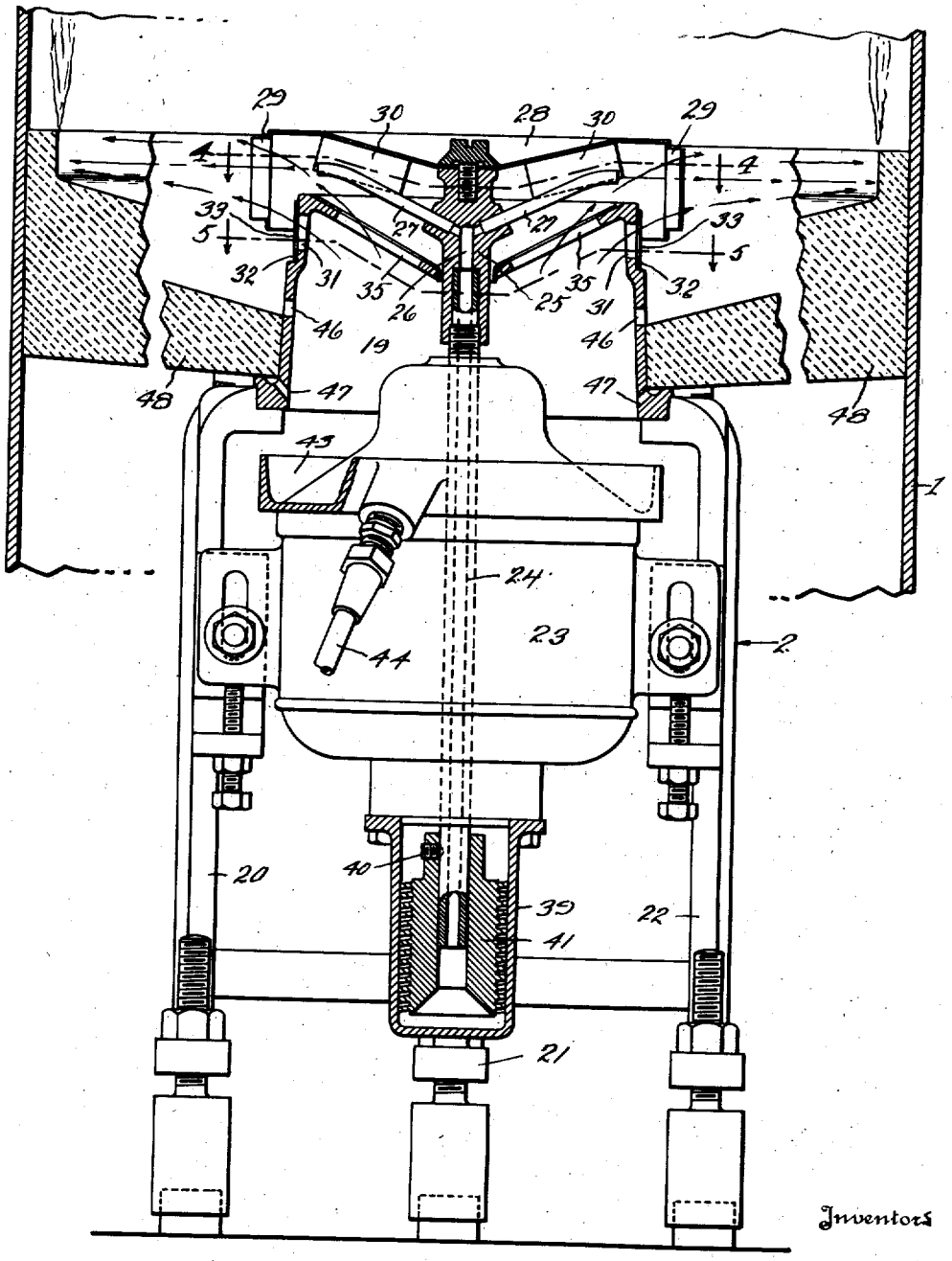
Figure 4:
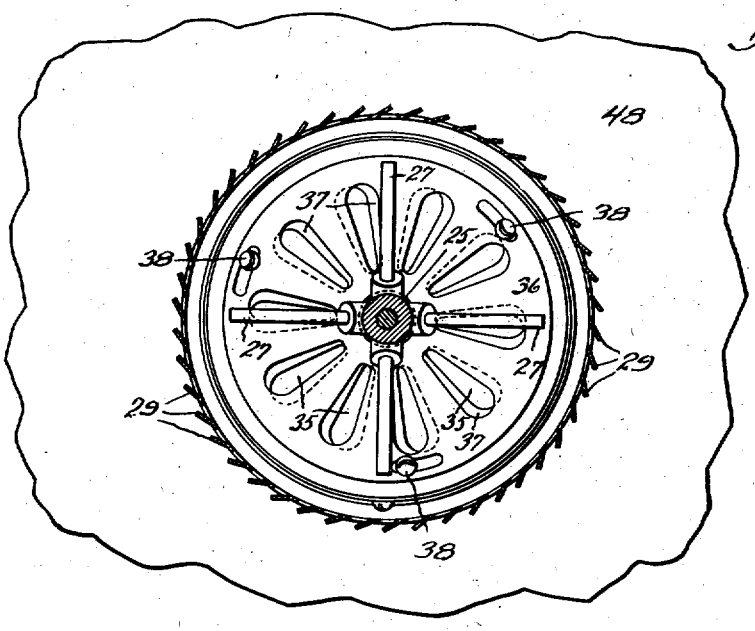
Figure 5:
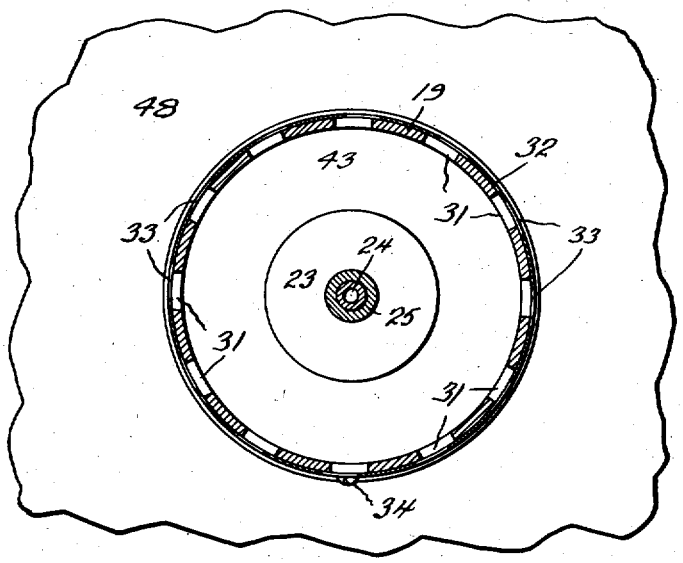

In the drawings accompanying and forming a part of this specification, Fig. 1 is a view in front elevation of our improved burner unit connected with the household furnace of the usual type; Fig. 2 is a view partly in vertical section and partly in side elevation of our improved burner and showing the upper end of the burner positioned within the firebox of the furnace; Fig. 3 is a view partly in vertical section and partly in front elevation disclosing the fuel supply means and the manner of securing the several parts together; Fig. 4 is a horizontal sectional view on the line 4—4 of Fig. 3; and Fig. 5 is a horizontal sectional view on the line 5—5 of Fig. 3.

Referring now to Fig. 1 of the drawings, the numeral 1 designates a furnace in which is positioned our burner unit designated generally by the reference character 2. Positioned preferably in close proximity to the furnace is a tank 3 adapted to contain the source of fuel supply. Leading from the tank 3 is a valve controlled fuel supply pipe 4 which is connected with an oil regulator 5 so positioned with respect to the burner as to provide a constant head for the fuel. Connected with the oil regulator 5 is a pipe 6 which leads to an oil strainer 7 which removes foreign matter from the oil and connected with the opposite side of the oil strainer 7 is a pipe 8 having a needle valve 9 therein and also a solenoid valve 10 the purpose of which will hereinafter appear. Leading from the oil valve 10 is a pipe 11, having a valve 12 therein which connects with the lower end of the burner in a manner to be hereinafter set forth. The numeral 13 designates a gas supply pipe which is provided with a solenoid gas control valve 14 which is normally held in closed position and connects with a pilot burner 15. The valves 10 and 14 are adapted to be opened by any suitable means either electrical or mechanical which automatically control the position of the valves. The valve 14 is never entirely cut off but always allows sufficient gas to flow to keep the pilot 15 burning. It will be noted that there are three valves in the oil supply line, namely: the needle valve 9, the automatic valve 10 and the valve 12. The valve 12 is in the nature of a safety valve and is automatically closed when the overflow or trip bucket 18 becomes sufficiently filled with oil to depress the pivotally mounted lever 18′ to close the valve.

Referring now to Fig. 3 the burner unit proper comprises an annular casting 19 which is supported by means of a plurality of adjustable legs 20, 21 and 22 so that the height of the same may be adjusted. Carried by the legs 20, 21 and 22 is an electric motor 23 having a hollow shaft 24 which projects upwardly through an opening in the casting 19. Detachably secured to the upper end of the hollow shaft 24 is a distributing head 25 having a bore 26 therein which is in open communication with a plurality of tubes 27. Secured to the upper end of the distributing head 25 is a fan member 28 which is preferably formed from a single piece of heat resisting sheet metal and provided with a plurality of blades 29 on the periphery thereof and a plurality of blades 30 on the bottom side thereof. The annular casting 19 is shaped in section as shown most clearly in Fig. 3 and around its periphery is provided with a plurality of ports 31 which serve as air inlets.

Secured over the top of the annular casting 19 is an annular plate 32 which is provided with a plurality of ports 33. The annular member 32 may be adjusted with respect to the casting 19 to vary the size of the ports 31 and is secured in adjusted position by means of a set screw 34. The top of the casting 19 is somewhat funnel shaped and is provided with a plurality of openings 35. Fitting over the top of the casting 19 is a plate 36 provided with a plurality of openings 37 adapted to be brought into alignment with the openings 35. The plate 37 may be adjusted with respect to the top of the casting to vary the size of the inlet opening 35 and is secured in adjusted position by set screws 38.

Secured to the lower end of the motor is a hollow casting 39 forming a chamber to the lower end of which the fuel supply pipe 11 is connected (see Fig. 1). The shaft 24 projects downwardly into chamber 39 and secured to the lower end of the shaft by means of a set screw 40 is a threaded sleeve or rotor 41, the purpose of which will hereinafter appear. Connected with the upper end of the chamber 39 is a T 42 (see Fig. 1) and supported on the upper end of the motor 23 is an annular drip pan 43 which is adapted to receive any oil which may drip from the firebox. The pan 43 is connected with the T 42 by means of a pipe 44 and also connected with the T 42 is a pipe 45 leading to the trip bucket 18, the purpose of which will also hereinafter appear. The casting 19 is also provided with a plurality of ports 46 which serve to deliver into the drip pan 43 any oil which may escape into the firebox. The casting 19 is also provided with a plurality of openings 47 which serve to deliver into the drip pan 43 any oil which may seep past the refractory material 48 around the casting 19.

The valves 10 and 14 are normally closed and are opened by means of solenoids, the circuits to which are controlled by the protecto-relay 17. The protecto-relay 17 is in circuit with the protectostat 16 and also the room thermostat or thermostats form no part of this invention. Controls of this character may be purchased on the open market and are adapted for connection with any standard burner unit. Our device is also adapted for use with a mechanical control unit for controlling the motor and the oil and gas valves. Mechanical control units for burner units of this type may also be purchased on the open market.

Assuming that it is desired to start the furnace and deliver heat to the rooms to be heated, the fuel supply valve 4′ is opened and a manually operated switch on the protecto-relay 17 is moved to close the circuit to the motor 23. The fuel now flows through the pipe 4, valve 4′, oil regulator 5, pipe 6, strainer 7, pipe 8, valve 9, valve 10, which is held open by the relay, valve 12 which is now open, and thence through pipe 11 into the bottom of the chamber 39. The switch to the motor having been closed the same will be in operation and the shaft 23 will be rotating and with it necessarily the rotor 41. As the rotor 41 is rotating the fuel cannot flow past the threads in the same and will necessarily flow up the hollow shaft 24 and be delivered through the oil distributing head and tubes 27. When the motor is started the gas expanding valve 14 is automatically actuated to expand the pilot flame and the fuel delivered through the tubes 27 will be atomized and mixed with air and ignited by the coming in contact with expanded pilot flame. As soon as sufficient heat is generated within the firebox the protectostat 16 on the furnace door will be actuated to break a circuit to allow the valve 14 to return to its former position and the gas supply will be cut down and only sufficient gas will be admitted through the valve 14 to keep the pilot flame burning. The motor will continue running and the burner will be supplied with oil through the pipe 11 and the hollow shaft 24. When the temperature is in the room to be heated reaches a predetermined point the thermostat therein will be actuated to cut off the supply of current to the motor and the valve 10 will be allowed to close to cut off the supply of fuel. When the temperature in the room to be heated falls to a predetermined point the protecto-relay 17 will again open the valve 10, close the circuit to the motor 23 and expand the pilot flame by opening the valve 14. The fuel will again become ignited and the burner continue in operation until the thermostat in the room to be heated is again actuated to repeat the cycle of operation. Should the fuel fail to ignite when the motor is started, the oil will flow down through the ports 46 into the pan 43 and thence through pipe 44, T 42, pipe 45 and fill the bucket 18 which will actuate lever 18′ to close the valve 12 and cut off the supply of fuel. Should the motor 23 fail to start at the proper time or for some reason stop, the fuel will flow into the bottom of chamber 39 and past the screw threaded rotor 41 and fill the chamber 39 and overflow through the T 42 and pipe 45 and be delivered into the bucket 18 which will close valve 12 and cut off the supply of fuel.

One of the main features of our invention is the fan member 28 which is preferably formed from a single piece of heat resisting metal. From an inspection of Fig. 3 it will be seen that the fan blades 29 project downwardly below the delivery end of the distributer tubes 27 so that when the motor is running air for supporting combustion will be drawn in through the openings in the casting 19 as indicated by the arrows in Fig. 3. The result obtained is that there will be a layer of atomized fuel delivered between two layers of air. This construction provides for a very efficient mixture of air and atomized oil and results in an extremely hot flame disposed around the entire periphery of the firebox. The plates 33 and 36 may be adjusted to effect a proper mixture of air and atomized oil so that a very efficient flame is obtained. The simplicity of the burner unit and the ease with which it may be assembled and disassembled will adapt the same for the purpose for which it is intended.

It will now be clear that we have provided a burner unit which will operate under all conditions and which will automatically cut off the supply of oil should the burner fail to ignite or the motor fail to start for any reason. Various changes may be made in our construction without departing from the spirit of our invention and we wish our invention to be limited only in accordance with the scope of the appended claims.

Having thus described our invention, what we claim is:—

1. A burner unit of the class described comprising a frame, a casting supported by said frame and adapted to be positioned beneath a firebox of a furnace, said casting having an annular depending portion having a plurality of openings therein and being provided with an opening in the top thereof, a motor carried by said frame and having a hollow shaft projecting into the top of said casting, a distributing head carried by said shaft and a fan carried by said distributing head, said distributing head having a plurality of tubes extending outwardly therefrom, the blades of said fan extending below and past the delivery end of said tubes and means for supplying liquid fuel to said distributing head.

2. A burner unit of the class described comprising a frame, a casting supported by said frame and adapted to be positioned within an opening in a firebox, a plurality of air inlet openings in said casting, a motor carried by said frame and having a hollow shaft projecting upwardly through said casting, a distributing head rigidly secured to said hollow shaft and having a plurality of discharge tubes disposed in open communication with the said hollow shaft, and a fan member rigidly secured to said distributing head and having a plurality of fan blades formed thereon and extending downwardly past the delivery end of said distributing tubes and means for varying the size of said air inlet openings.

3. A burner unit of the class described comprising a vertical rotary, hollow shaft, a distributing head secured to said hollow shaft, a casing surrounding the lower end of said shaft and having an overflow opening therein, a liquid fuel supply pipe connected with said casing, a member disposed within said casing and non-rotatably secured to said shaft, said member closely fitting within said casing and having a bore therein connecting the interior of said casing with the interior of said hollow shaft, the periphery of said member being threaded and the pitch of the threads being such that when said shaft is rotated in one direction the fuel will be forced into said hollow shaft, said member being positioned between said supply pipe and said overflow opening.

4. In a burner unit of the class described, the combination of a distributing head, a rotary hollow shaft connected with said distributing head and depending therefrom, a casing surrounding the lower end of said hollow shaft and having an overflow opening therein, a liquid fuel supply pipe leading into said distributing head, a member disposed within said casing and non-rotatably secured to said shaft, said member closely fitting within said casing and serving to force the liquid fuel into said hollow shaft when rotated in one direction and permitting the liquid fuel to flow through said casing and overflow opening when the shaft is at rest.

5. A burner unit of the class described comprising a frame, a casting supported by said frame and adapted to be positioned beneath a firebox of a furnace, said casting having an annular top portion provided with openings therein for passage of air therethrough, means associated with said casting for regulating the amount of air passing through said openings, a motor carried by said frame and having a hollow shaft projecting through the top portion of said casting, a distributing head carried by said shaft and a fan carried by said distributing head, said distributing head having a plurality of outwardly directed discharge passages leading from and in open communication with said hollow shaft, the blades of said fan extending above, below and radially beyond the discharge end of said passages, and means for supplying liquid fuel to said distributing head.

6. A burner unit of the class described comprising a motor having a vertical hollow shaft, a distributing head rigidly secured to said hollow shaft, a chamber connected with the lower end of said motor and in which the lower end of said hollow shaft is disposed, a supply pipe for delivering liquid fuel to the lower end of said chamber, a member non-rotatably connected with said hollow shaft and closely fitting within said chamber for directing the flow of fuel into said hollow shaft when the same is being rotated, an overflow opening in said chamber, and said member being disposed between said supply pipe and said overflow opening.

7. In a fluid fuel burner of the class described the combination of a frame, a casting supported by said frame and adapted to be positioned in the fire box of a furnace, said casting having openings in the upper portion thereof for the passage of air, a hollow shaft projecting through the top of said casting, a fuel distributing head on the upper end of said shaft, said head having a plurality of discharge tubes projecting therefrom and adapted to discharge the fuel above the top of said casting, a fan member rigidly secured to said distributing head, said fan comprising a circular top portion and a downwardly extending cylindrical peripheral wall portion, the cylindrical portion extending downwardly beyond the end of said discharge tubes, said cylindrical portion including a plurality of fan blades between which the oil is expelled from said tubes in the form of separate jets.

8. A burner unit including a hollow casting provided with a downwardly concave upper wall, said casting being adapted to project through the bottom wall of a firebox of a heater, a distributing head extending through said concave upper wall, means for rotating said head, said head including radially extending tubes, means for supplying liquid fuel to said tubes, said casting having air inlet openings therein, said openings being adjustable in size, said head carrying a fan, and said unit including means whereby said fan draws air through said openings into mixing relation with liquid fuel from said tubes.

9. A burner unit including a hollow casting provided with a downwardly concave upper wall, said casting being adapted to project through the bottom wall of a firebox of a heater, a distributing head extending through said concave upper wall, means for rotating said head, said head including radially extending tubes, means for supplying liquid fuel to said tubes, said casting having air inlet openings therein, said openings being adjustable in size, said head carrying a fan, and said unit including means whereby said fan draws air through said openings into mixing relation with liquid fuel from said tubes, said openings being in said concave upper wall.

10. In a burner unit of the class described, the combination of a distributing head, a hollow shaft connected with said distributing head and depending therefrom, a casing surrounding the lower end of said hollow shaft and having an overflow opening therein, a liquid fuel supply pipe leading into said casing, a member disposed within said casing and non-rotatably secured to said shaft, said member closely fitting within said casing and serving to force the liquid fuel into said hollow shaft when rotated in one direction and permitting the liquid fuel to flow through said casing and overflow opening when the shaft is at rest, said burner unit including a fuel cut-off means and a tube communicating with said casing.

11. A fuel and air distributing unit for heaters wherein a fuel mixture is discharged against an annular refractory member near the walls of the heater, comprising an annular member extendible into the fire box of the heater, an electric motor having a hollow shaft disposed coaxially with said annular member, a head mounted on said hollow shaft, a plurality of fuel discharge tubes extending radially from said head to discharge fuel in a plane above said annular member, said head having a passageway interconnecting said tubes and hollow shaft, a plate carried by said head above said tubes, a plurality of fan blades mounted at the under side of said plate to draw air through said annular member during rotation of said head, said plate serving to deflect the air outwardly in the direction of flow of fuel from said tubes, means for regulating the flow of air through said annular member, and means for directing fuel into said hollow shaft.

12. A fuel and air distributing unit for liquid fuel burners of the rotary type, comprising a centrifugal fuel and air distributing head, a vertical hollow shaft for feeding fuel to said head, an electric motor for rotating said head, said shaft extending axially through the rotor of said motor and projecting below said motor, a cylindrical casing surrounding the projecting end of said shaft, and a cylindrical element rigidly secured to the lower end of said hollow shaft and being closely fitted within said casing, said element having narrow spiral grooves in the circumferential face thereof spiralling in the direction opposite to the direction of rotation of said shaft to prevent passage of fuel between said element and casing during rotation of said shaft, and the lower end of said element having an opening therein communicating with said hollow shaft and with the interior of said casing.

13. The combination with a furnace having a combustion chamber, a hearth closing in the bottom of said chamber and a substantially endless refractory element extending above said hearth near the walls of said combustion chamber, said hearth having a central opening therein, of an air inlet casing mounted within said opening, a vertical shaft extending within said casing, a motor for rotating said shaft, a head mounted on the upper end of said shaft for rotation therewith for discharging an oil and air mixture across said combustion chamber and against said refractory element, said head including an oil receiving element having radially arranged discharge conduits in direct and positive communication therewith, said conduits being disposed above the plane of said hearth, a plurality of fan blades disposed between said conduits and extending inwardly from the region of the outlet ends of said conduits towards the axis of said head for drawing air upwardly through said casing and a disk disposed above said discharge conduits and fan blades for directing the air drawn upwardly by said blades into the oil being discharged from said discharge conduits, means for feeding oil to said oil receiving element, and controllable means for regulating the passage of air through said air inlet casing.

14. Oil burning apparatus for furnaces having a combustion chamber and a hearth closing the lower end of said chamber and including an upstanding substantially endless refractory element near the walls of said chamber, comprising an air inlet casing extending centrally through said hearth, means for regulating the flow of air through said casing, a rotary fuel and air projector, and power means for rotating said projector, said rotary projector including an oil receiving chamber, a plurality of oil discharge conduits extending radially above said casing and having direct and positive communication with said oil receiving chamber, means for introducing oil into said oil receiving chamber, a plurality of fan blades between said conduits and a disk disposed in a plane above said blades and oil discharge conduits and projecting radially beyond the ends of said conduits for directing the air flowing through said casing during rotation of said projector into mixing relation with the oil discharged from said conduits, whereby an atomized mixture is distributed from a central region in said combustion chamber outwardly below the products of combustion and thrown against said endless refractory element where it is vaporized and burned in the form of an endless ring of flame substantially at the walls of said combustion chamber.

15. A burner unit including a centrifugal distributing head rotatably mounted with respect to a furnace, said head including radial fuel supply tubes, a fan element fixed to said head and having vanes extending above and below the delivery ends of said tubes and being disposed radially outside said ends.

16. In a burner structure, the combination with a rotatable head provided with means for emitting jets of liquid hydrocarbon fuel, of a depending baffle structure comprising blades associated with said head disposed in the path of said jets and adapted both to atomize said jets and to admix air for combustion therewith, and means for rotating said head.

17. In a burner structure, the combination with a rotatable burner head provided with means for emitting streams of liquid hydrocarbon fuel, of a depending baffle structure disposed about the periphery of said head, comprising a plurality of blades disposed in substantialy vertical planes slightly inclined to the radii of said head, said blades being in the path of said streams and adapted to admix air therewith, and power means for rotating said head.

18. In a burner structure, the combination with a rotatable head provided with means for emitting streams of liquid hydrocarbon fuel, of a cap-plate secured to said head having blades secured to said head about the periphery of said cap-plate in planes substantially at right angles to the plane of said cap-plate, said planes being slightly inclined to the radii of said cap-plate, said blades depending from said cap-plate and arranged both to atomize by impact said streams of fuel and to impel air for combustion, and power means for rotating said head.

19. A fuel and air distributing unit for furnaces of the type wherein air and oil are discharged outwardly above a hearth and thrown into contact with an annular member located adjacent the inner wall of the furnace combustion chamber, comprising a horizontally rotatable head having a liquid fuel receiving portion, a plurality of radially extending tubes connected with said portion for discharging jets of liquid fuel, a plate-like member disposed above said tubes, and a plurality of fan blades associated with said deflecting member for discharging air outwardly in the direction of travel of the oil issuing from said tubes, means for regulating the amount of air, and power means for rotating said head.

20. A fuel and air distributing unit for liquid fuel burners of the rotary type wherein fuel is discharged against a peripheral hearth member of a furnace for combustion, comprising a vertically arranged annular member extendible into the combustion chamber of the furnace, a rotatable distributing head coaxial with said annular member and having a plurality of generally radial discharge passages disposed to discharge jets of liquid fuel outwardly above said annular member, means to supply liquid fuel to said passages, a plurality of fan blades carried by said head to draw air through said annular member and discharge the same outwardly above said annular member toward said peripheral hearth member, a shutter device carried by said annular member to regulate the flow of air therethrough, and means for rotating said head.

21. A fuel and air distributing unit for furnaces of the type wherein air and oil are discharged outwardly above a hearth and thrown into contact with an annular member located adjacent the inner wall of the furnace combustion chamber, comprising a horizontally rotatable head having a liquid fuel receiving portion, a plurality of radially extending tubes connected with said portion for discharging jets of liquid fuel, a plate-like member disposed above said tubes, and a plurality of fan blades associated with said deflecting member for discharging air outwardly in the direction of travel of the oil issuing from said tubes, and power means for rotating said head.

22. In a burner structure, a rotatable fuel and air distributing unit having its axis vertically arranged and having an oil receiving portion, a plurality of radially extending tubes for receiving oil from said portion and discharging the same in a generally horizontal direction, and an air deflecting member above said tubes, said deflecting member having a plurality of spaced fan blades extending downwardly from the periphery thereof and inclined slightly with respect to the radii of said deflecting member for discharging at least a portion of the air in a generally horizontal direction, means for feeding oil to said portion, and means for rotating said head.

23. In a burner structure, a rotatable fuel and air distributing unit having its axis vertically arranged and having an oil receiving portion, a plurality of tubes radiating outwardly from said portion for receiving oil therefrom and for discharging the oil in a generally horizontal direction, and an air deflecting member disposed above said tubes, said deflecting member having a downwardly extending peripheral flange, said flange having a number of spaced fan blades therein, said structure including means for supplying oil to said receiving portion, and means for rotating said head.

24. A burner unit including an annular casing adapted to project through the bottom wall of a firebox of a heater, a distributing head extending through said casing, means for rotating said head, said head including radially extending tubes, and means for supplying liquid fuel to said tubes, said casing having means providing air inlet openings, said openings being adjustable in size, said head carrying a fan, said unit including means whereby said fan draws air through said openings for outward flow above said bottom wall in the direction of travel of the fuel issuing from said tubes.

25. A burner unit including an annular casing adapted to project through the bottom wall of a firebox of a furnace, a distributing head extending through said casing and including radially extending fuel discharge tubes and a fan, means for supplying liquid fuel to said tubes, and means for rotating said head, said casing having means providing air inlet openings and means for adjusting the size of said openings, said unit including means whereby said fan draws air through said openings and for causing a portion of said air to flow directly around and past said tubes and a portion to flow outwardly directly below the outlets of said tubes.

26. A burner unit including a casing adapted to project through the bottom wall of a furnace firebox, a horizontally rotatable distributing head extending through said casing and having radially extending fuel discharge tubes and a plurality of fan blades disposable above the level of said bottom wall for drawing air through said casing, means for supplying liquid fuel to said tubes, and means for rotating said head, said head including a deflecting member disposed above said tubes and blades for causing a portion of the air drawn through said casing to flow directly around and outwardly past said tubes and a portion to flow outwardly below the outlet ends of said tubes.

SAMUEL L. LAUGHLIN.
HERMAN F. BRAUN.
WILLIAM J. SMITH.